United States Patent [19]

Kawamura

[11] Patent Number: 4,966,117
[45] Date of Patent: Oct. 30, 1990

[54] SYSTEM AND METHOD FOR CONTROLLING IGNITION TIMING FOR VEHICULAR INTERNAL COMBUSTION ENGINE

[75] Inventor: Yoshihisa Kawamura, Kanagawa, Japan

[73] Assignee: Nissan Motor Company, Limited, Japan

[21] Appl. No.: 330,343

[22] Filed: Mar. 28, 1989

[30] Foreign Application Priority Data

Mar. 29, 1988 [JP] Japan .............................. 63-41453[U]

[51] Int. Cl.$^5$ .......................... F02P 23/00; F02P 5/00
[52] U.S. Cl. ................................................... 123/425
[58] Field of Search ............... 123/425, 417, 435, 406, 123/416; 73/35

[56] References Cited

U.S. PATENT DOCUMENTS

| 4,425,890 | 1/1984 | Yamaguchi | 123/418 |
|---|---|---|---|
| 4,458,646 | 7/1984 | Suzuki et al. | 123/425 |
| 4,468,950 | 9/1984 | Ishigami et al. | 73/35 |
| 4,517,952 | 5/1985 | Hosoya | 123/638 |
| 4,582,032 | 4/1986 | Hara et al. | 123/339 |
| 4,625,690 | 12/1986 | Morita | 123/340 |
| 4,630,583 | 12/1986 | Suzuki et al. | 123/425 |
| 4,640,249 | 2/1987 | Kawamura et al. | 123/425 |
| 4,640,250 | 2/1987 | Hosaka et al. | 123/425 |
| 4,658,787 | 4/1987 | Takizawa | 123/418 |
| 4,658,789 | 4/1987 | Morita | 123/422 |
| 4,660,535 | 4/1987 | Asano | 123/425 |
| 4,676,212 | 6/1987 | Kashimura et al. | 123/425 |
| 4,690,116 | 9/1987 | Takahashi | 123/425 |
| 4,693,221 | 9/1987 | Nakajima et al. | 123/425 |
| 4,694,800 | 9/1987 | Morita | 123/425 |
| 4,708,113 | 11/1987 | Harada et al. | 123/425 |
| 4,721,089 | 1/1988 | Currie et al. | 123/425 |
| 4,727,842 | 3/1988 | Takahashi | 123/425 |
| 4,750,103 | 6/1988 | Abo et al. | 364/431.18 |
| 4,770,143 | 9/1988 | Takahashi | 123/425 |
| 4,774,922 | 10/1988 | Morita | 123/425 |
| 4,785,783 | 11/1988 | Oshiage et al. | 123/417 |
| 4,809,664 | 3/1989 | Nakamoto et al. | 123/425 |
| 4,819,603 | 4/1989 | Morita et al. | 123/425 |
| 4,848,299 | 7/1989 | Satoh et al. | 123/425 |

FOREIGN PATENT DOCUMENTS

| 58-82074 | 5/1983 | Japan | 123/425 |
|---|---|---|---|
| 62-96779 | 5/1987 | Japan | 123/425 |
| 62-298661 | 12/1987 | Japan | 123/425 |

Primary Examiner—Raymond A. Nelli
Attorney, Agent, or Firm—Lowe, Price, LeBlanc, Becker & Shur

[57] ABSTRACT

A system and method for controlling an ignition timing for a vehicular internal combustion engine are disclosed in which a feedback correction quantity for the ignition timing value is calculated on the basis of a result of detection of at least one of an occurrence of engine knocking and a position at which a combustion pressure becomes maximum and the feedback correction quantity is added to a basic ignition timing angle value based on engine operating conditions to determine a final ignition timing angle value. The feedback correction quantity is limited by a limit value set so as to be varied with the increase of a vehicle speed when the feedback correction quantity is advanced toward an advance angle value. The limit value is retarded when the vehicle speed is low, thus suppressing a combustion noise. On the other hand, the limit value is advanced when the vehicle speed is high, thus achieving the engine output torque and fuel economy.

14 Claims, 5 Drawing Sheets

SYSTEM AND METHOD FOR CONTROLLING IGNITION TIMING FOR VEHICULAR INTERNAL COMBUSTION ENGINE

BACKGROUND OF THE INVENTION (1) Field of the invention

The present invention relates to a system and method for controlling an ignition timing for a vehicular internal combustion engine.

(2) Description of the Background Art

A Japanese Patent Application First Publication No. sho 62-298661 published on Dec. 25, 1987 exemplifies a previously proposed system for controlling an ignition timing for a vehicular internal combustion engine.

In the above-identified Japanese Patent Application Publication, a presence or absence of occurrence of engine knocking is detected whenever the engine is ignited. If the engine knocking occurs, a feedback correction amount is increased by a predetermined amount, e.g., 1 crank angle (CA) for each ignition. If no engine knocking occurs, the feedback correction amount is decreased by the predetermined amount, e.g., 1 CA. In this way, the feedback correction amount is calculated. Then, the above-described feedback correction amount is added to a basic ignition timing read from a basic ignition timing table to derive a final ignition timing.

A U.S. Pat. No. 4,660,535 issued on Apr. 28, 1987, Japanese Patent Application First Publication No. Sho 58-82074 published on May 17, 1983 and Japanese Patent Application First Publication No. Sho 62-96779 published on May 6, 1987 exemplify other previously proposed ignition timing controlling system and method in which so-called MBT (Minimum Advance for a Best Torque) control is carried out to control the ignition timing to be brought at a minimum advance angle for a best torque position, i.e., an MBT point at which a maximum output torque can be derived on the basis of a detection of a peak value position of a combustion pressure.

The MBT control is based on such an engine characteristic that an engine generation torque becomes maximum if the ignition timing is set so that the peak position of the crank angle position at which the combustion pressure becomes maximum reaches a proximity to ATDC 15 (15 After Top Dead Center).

When, e.g., an internal cylinder pressure responsive sensor is used to detect actually the combustion pressure in any one of the engine cylinders, the ignition timing is controlled in the feedback mode so that the peak position of the maximum combustion pressure becomes in the vicinity of ATDC 15. In this case, the required feedback correction amount is calculated on the basis of a deviation between the detected peak position and predetermined crank angle position (set to the vicinity of 15 ATDC as described above) and is added to the basic ignition timing value.

Although in the above-identified U.S. Patent and other Japanese Patent Application Publications the feedback correction quantity is provided for both advance angle side and retardation angle side, combustion noises in the engine becomes largely increased, e.g., when the ignition timing becomes advanced limitlessly with no complete occurrence of knocking. Therefore, a proper limit value of the advanced ignition timing is set at the advance angle side in the actual engine so that no more advance of the ignition timing occurs. (This limit value setting is applied to the MBT control.)

However, since the limit value is fixedly determined according to each of engine operating conditions, the limit value is often set toward a more retardation angle side than an optimum ignition timing for the individual engines in order to place importance on the combustion noise reduction.

SUMMARY OF THE INVENTION

It is therefore an object of the present invention to provide a system and method for controlling an ignition timing for an internal combustion engine in which the limit value is relatively set toward the retardation angle side when an engine speed is low at which the combustion noise gives an unpleasant feeling and the limit value is set at relatively advance angle side when the engine speed is high at which the combustion noise does not give the unpleasant feeling.

The above-described object can be achieved by providing a system for controlling an ignition timing for a vehicular internal combustion engine, comprising: (a) first means for detecting engine operating conditions; (b) second means for setting a basic ignition timing value according to the engine operating conditions; (c) third means for detecting at least one of the occurrence of engine knocking and a position at which an engine combustion pressure becomes maximum; (d) fourth means for calculating a feedback correction quantity of the ignition timing on the basis of the result of detection of at least one of the occurrence of engine knocking and maximum position of the combustion pressure; (e) fifth means for detecting a vehicle speed; (f) sixth means for setting a limit value for a advance angle side of the feedback correction quantity according to the detected vehicle speed; and (g) seventh means for finally determining the ignition timing from the addition of the feedback correction quantity to the basic ignition timing angle value.

The above-described object can be achieved by providing a method for controlling an ignition timing for a vehicular internal combustion engine, comprising the steps of: (a) detecting engine operating conditions; (b) setting a basic ignition timing value according to the engine operating conditions; (c) detecting at least one of the occurrence of engine knocking and a position at which an engine combustion pressure becomes maximum; (d) calculating a feedback correction quantity of the ignition timing on the basis of the result of detection of at least one of the occurrence of engine knocking and maximum position of the combustion pressure; (e) detecting a vehicle speed; (f) setting a limit value for a advance angle side of the feedback correction quantity according to the detected vehicle speed; and (g) determining the ignition timing from the addition of the feedback correction quantity to the basic ignition timing angle value.

DETAILED DESCRIPTION OF THE PREFERRED EMBODIMENT

Reference will hereinafter be made to the drawings in order to facilitate understanding of the present invention.

Figure 1:
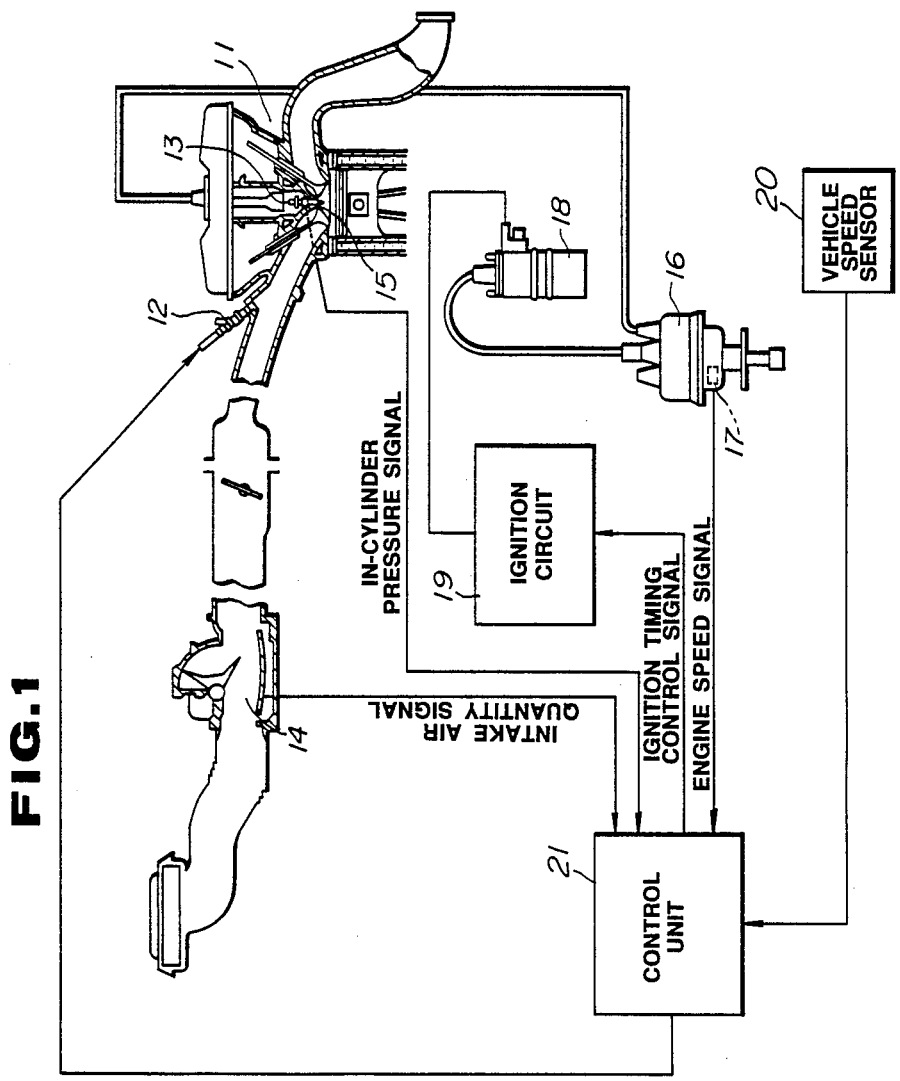
FIG. 1 is a schematic circuit block diagram of a system for controlling an ignition timing for an internal combustion engine.

FIG. 1 shows a preferred embodiment of an ignition timing controlling system according to the present invention.

An internal combustion engine 11 includes a fuel injection valve 12 and ignition plugs 13. An airflow meter 14 detects an intake air quantity sucked into the engine 11. Internal cylinder pressure responsive sensors 15 detect a combustion pressure of the internal combustion engine 11. The structure of the in-cylinder (internal combusition chamber of each engine cylinder) pressure responsive sensor 15 is exemplified by a U.S. Pat. No. 4,660,535 issued on Apr. 28, 1987, the disclosure of which is hereby incorporated by reference.

The in-cylinder pressure responsive sensor 15 is attached around a periphery of each of the ignition plugs 13 as a washer. The in-cylinder pressure responsive sensor 15 includes a piezoelectric element.

Each in-cylinder pressure responsive sensor 15 detects the combustion pressure in the corresponding cylinder so as to determine on occurrence of engine knocking.

Such a knocking sensor as to detect the occurrence of knocking from vibrations generated from a cylinder block may be used. (Refer to the Japanese Patent Application First Publication No. sho 62-298661 published on Dec. 25, 1987.)

A distributor 16 is provided with a crank angle sensor 17. An ignition device 19 is provided for interrupting a primary current flowing through an ignition coil 18. The crank angle sensor 17 outputs a pulse signal, e.g., for each 1 crank angle of rotation and a pulse signal when a predetermined position before a top dead center in a compression stroke of each cylinder. In addition, a vehicle speed sensor 20 detects the vehicle speed from a revolution number of an output axle in a transmission of the vehicle.

It is noted that the vehicle speed is detected from a relationship between the engine speed and gear position of the transmission.

A control unit 21 includes a microcomputer for controlling a fuel injection quantity, etc., derived from a fuel injection valve(s) 12 and ignition timing of the above-described ignition plugs 13. The control unit 21 receives the detection signals from the above-described sensors.

The control unit 21 executes a calculation processing in accordance with a predetermined program and outputs predetermined control signals to the fuel injection valve(s) 12 and ignition device 19.

Figure 2:
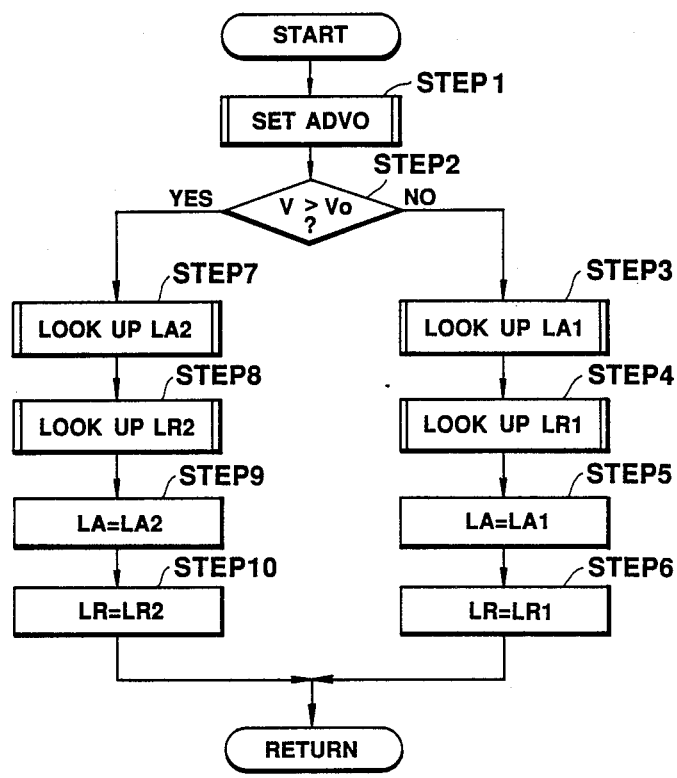
FIG. 2 is an operational flowchart of an ignition timing control program executed by the system shown in FIG. 1.
Figure 3:
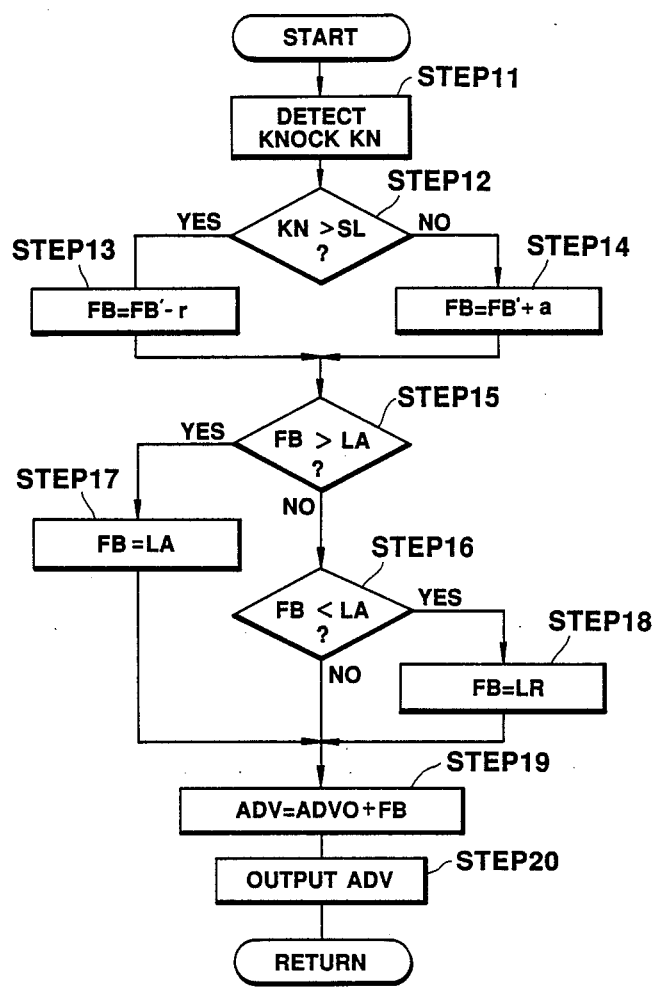
FIG. 3 is an operational flowchart of an ignition timing control program executed by the system shown in FIG. 1.

FIGS. 2 and 3 show ignition timing control routines to be executed by the control unit 21.

FIG. 2 shows a program routine for executing the sets of a basic ignition timing ADVO, advance angle side limit value LA, retardation angle side limit value LR according to an engine driving condition. Such a routine is executed repeatedly in synchronization with the crank angle or time.

In a step 1, a basic ignition timing ADVO is set.

The basic ignition timing ADVO is looked up from a predetermined basic ignition timing table on the basis of an engine drive condition, e.g., an engine speed and load (,e.g., basic fuel injection quantity $T_p$).

The basic ignition timing table is exemplified by the U.S. Pat. No. 4,660,535.

In a step 2, the control unit 21 reads the instantaneous vehicle speed V to compare with a predetermined vehicle speed $V_o$.

If $V \leq V_o$ in the step 2, the routine goes to steps 3 and 4 in which the control unit 21 looks up limit values from a low vehicle speed data table and a high vehicle speed data table LA1 and LR1 of an advance angle side and retardation angle side, respectively.

In steps 5 and 6, the values looked up from the above-described tables the control unit 21 sets as the advance angle side limit value LA1 and LR1.

The limit values are allocated to the above-described data tables LA1 and LR1 with the engine speed and load as parameters.

Especially, in the low vehicle speed data tables LA1 and LR1, relatively small values are set as a whole.

In other words, the limit values LA and LR are set toward relatively retarded angle side.

On the other hand, if $V > V_o$ in the step 2, i.e., the vehicle speed V is below the predetermined value $V_o$, the routine goes to steps 7 and 8 in which the control unit 21 looks up limit values from the advance angle side data table LA and retardation angle side data table LR, respectively.

The above-described data tables LA2 and LR2 for the high speed are set with the engine speed and engine load as the parameters. Especially, the limit values for the advance angle side when the vehicle speed is high are set to a relatively large value. In other words, the limit values for the advance angle side is relatively larger than those for the retardation angle side.

FIG. 3 shows an ignition timing feedback control routine.

The routine shown in FIG. 3 is executed for each cylinder in synchronization with the crank angle.

In a step 11, the control unit 21 reads the knocking signal KN derived from the in-cylinder pressure responsive sensor installed in the corresponding cylinder.

The knocking signal KN is produced after a signal processing of an output signal from any one of the pressure responsive sensors 15 in a step 11.

The level of the knocking signal KN indicates an intensity of the knocking detected. The processing of the knocking signal KN is exemplified by the U.S. Pat. Nos. 4,660,535 and No. 4,640,249.

In a step 12, the control unit 21 compares the knocking signal KN with a slice level SL which is set in another routine not shown according to the engine speed. In other words, the control unit 21 determines whether the knocking exceeding a predetermined slice level has occurred at the time of a previous combustion cycle.

If the knocking signal KN exceeds the slice level SL in a step 12, the routine goes to a step 13 in which a feedback correction quantity FB is retarded toward the retardation angle side. FB' denotes the feedback correction quantity at a previous time and r denotes a retardation angle correction quantity per ignition.

It is noted that as the feedback correction quantity FB becomes large, the ignition timing advance angle ADV becomes large, i.e., the ignition timing advances toward the advance angle side. On the other hand, if the knocking signal KN is below the slice level SL, the routine goes to a step 14 in which the feedback correction quantity FB is advanced. It is noted that a denotes an advance angle quantity per ignition.

In steps 15 and 16, the control unit 21 compares the feedback correction quantity FB with the advance angle side limit value LA and the retardation angle side limit value LR determined in the above-described routine. In other words, in a case where the feedback correction quantity FB is above the advance angle side limit value LA, the routine goes from the step 15 to the step 17. The feedback correction quantity FB is limited to the limit value LA. In a case where the feedback correction quantity FB is below the retardation angle limit value LR, the routine goes from the step 16 to the step 18. The feedback correction quantity FB is limited to the limit value LR.

Finally, the routine goes to a step 19 in which the feedback correction quantity FB is added to the basic ignition timing ADVO to determine the ignition timing ADV at the corresponding cylinder, i.e., the advance angle value from the top dead center (TDC).

In a step 20, the control unit 21 outputs ADV.

That is to say, if the knocking continues at the time of the acceleration of the engine 11, the value of the feedback correction quantity FB is gradually increased. Consequently, the ignition timing ADV is gradually advanced. Hence, the actual ignition timing is held in the vicinity of a kocking limit of each engine cylinder.

It is noted that the value of the feedback correction quantity FB is held within a range of the instantaneous advance angle side limit value LA and retardation angle side limit value LR. Therefore, the feedback correction angle quantity is not corrected toward the more advance angle correction side or toward the more retardation angle correction side.

The limit values LA and LR are set to a relatively small value when the vehicle speed is low and to a relatively large value when the vehicle speed is high depending on the change of the data table according to the vehicle speed. Hence, the excessive advance angle of the ignition timing is prevented when the vehicle speed is low due to the priority of the suppression of combustion noise. In addition, a sufficient advance angle of the ignition timing can be allowed with the priority of the output and fuel economy at the time of high vehicle speed at which no problem of the combustion noise occurs.

In the preferred embodiment, the limit values LA and LR are switched to two kinds of the data tables according to the feedback correction quantity FB.

Figure 4:
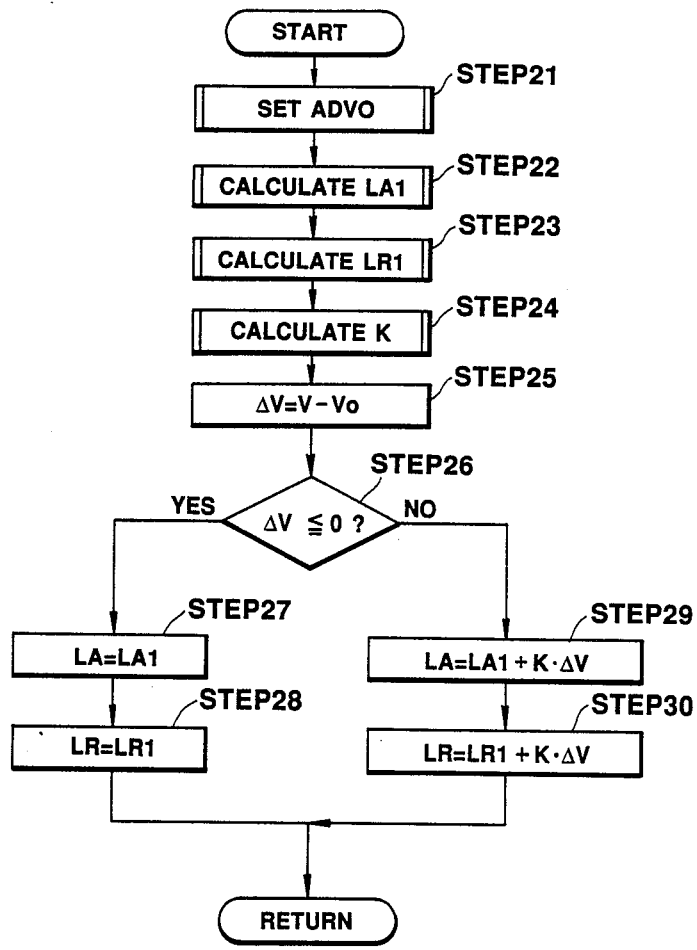
FIG. 4 is an operational flowchart of a limit value setting program executed by the system shown in FIG. 1.

However, the limit values LA and LR may continously be changed according to the vehicle speed as shown in the flowchart of FIG. 4.

FIG. 4 shows a flowchart of another ignition timing limit value setting routine.

In a step 21, the control unit 21 looks up the basic ignition timing ADVO from the basic ignition timing angle table. Then, in steps 22 and 23, the control unit 21 determines the advance angle side limit value LA1 and retardation angle side limit value LR1 for a reference low vehicle speed. This is calculated on the basis of a predetermined functional relationship, with the intake air quantity and engine speed as parameters. In a step 24, the control unit 21 calculates a correction coefficient k on the basis of the intake air quantity and engine revolution speed.

In a step 25, the control unit 21 calculates a difference $\Delta V$ between the instantaneous vehicle speed V and predetermined vehicle speed $V_o$. Then, the control unit 21 determines whether the speed difference $\Delta V$ is below zero.

If the speed difference $\Delta V$ is below zero, that is to say, the vehicle speed V is below the predetermined vehicle speed $V_o$, the routine goes to steps 27 and 28 in which the reference limit values LA1 and LR1 are directly set as the advance angle limit value LA and retardation angle limit value LR. In addition, if the speed difference V exceeds zero, i.e., the vehicle speed V is high exceeding the predetermined vehicle speed $V_o$, the routine goes to steps 29 and 30 in which the correction quantity according to the vehicle speed difference $\Delta V$ is added to the reference limit values LA1 and LR1. As the vehicle speed V is high, the limit values LA and LR become large.

Figure 5:
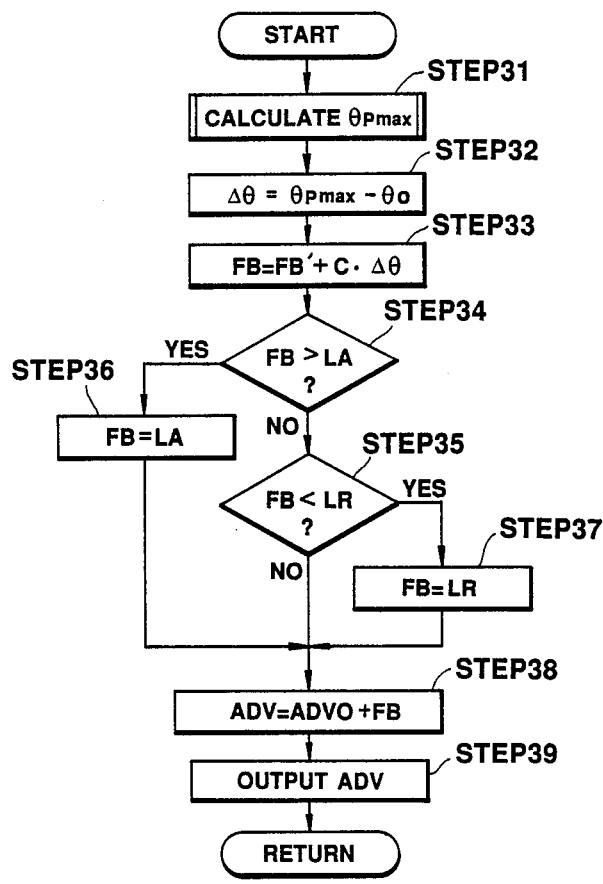
FIG. 5 is an operational flowchart of an MBT control program to which the present invention has been applied.
Figure 6:
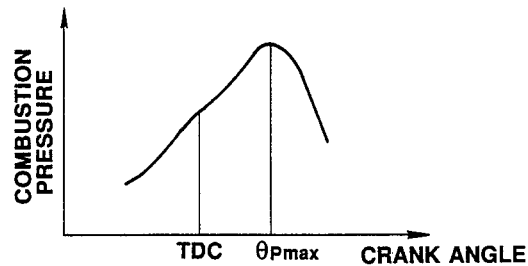
FIG. 6 is a characteristic graph representing a relationship between a combustion pressure and crank angle.

FIG. 5 shows a flowchart in which the present invention has been applied to so-called MBT control. It is noted that the hardware construction of the MBT control ignition timing system is the same as shown in FIG. b.

The details of the MBT control is exemplified by a U.S. Pat. No. 4,640,249 issued on Feb. 3, 1987, the disclosure of which is hereby incorporated by reference.

In a step 31, the control unit 21 derives a maximum crank angular position $\theta_{pmax}$ at which the combustion pressure in the corresponding cylinder becomes peak.

A sampling of the combustion pressure signal derived by the in-cylinder pressure responsive sensor 15 is exemplified by a U.S. Pat. No. 4,640, 249.

If the value of $\theta_{pmax}$ is in the vicinity of ATDC 15 , the ignition timing is generally at the MBT point.

Next, in a step 32, the routine derives a difference $\theta$ between the detected peak position $\theta_{pmax}$ and predetermined crank angle $\theta_o$ (,e.g., set in the vicinity of ATDC 15 ). In a step 33, the control unit 21 calculates the feedback correction quantity FB according to the difference $\theta$. In the step 33, FB' denotes the feedback correction quantity at a previous combustion cycle and C denotes a predetermined coefficient.

In steps 34 to 39, the feedback correction quantity FB is limited within the range of the advance angle side limit value LA and retardation angle limit value LR in the same way as the preferred embodiment shown in FIG. 4. The feedback correction quantity FB is used to determine the final ignition timing ADV.

It is noted that both advance angle side limit value LA and retardation angle side limit value LR are set in the form of the vehicle speed V by means of the same program as those shown in FIG. 2 or FIG. 4.

Hence, although the feedback correction quantity FB is provided so that the combustion pressure peak position $\theta_{pmax}$ coincides with the predetermined crank angle value $\theta_o$, the feedback correction quantity FB is limited within a range of the limit values LA and LR set according to the vehicle speed V. Therefore, the excessive ignition timing angle is prevented at the time of low vehicle speed and the sufficient advance ignition timing angle is allowed for at the time of the low vehicle speed.

It is noted that the present invention is applicable to the ignition timing controlling system and method in which both knock suppression control and MBT control are executed as exemplified by U.S. patent application Ser. No. 183,716 filed on May 5, 1988, the disclosure of which is hereby incorporated by reference.

As described hereinabove, since the system and method for controlling an ignition timing for a vehicular internal combustion engine, the limit value at the advance angle side is set according to the vehicle speed, the excessive advance angle is prevented at the time of low vehicle speed and the sufficient advance angle is allowed for at the time of the high vehicle speed. Therefore, the combustion noise which would give the unpleasant feeling can be suppressed at the time of, e.g., idling. On the other hand, the engine output torque and fuel economy can be achieved when the vehicle speed is high and no problem of combustion noise occurs.

It will fully be appreciated by those skilled in the art that the foregoing description is made in terms of the preferred embodiments and various changes and modifications may be made without departing from the scope of the present invention which is to be defined by the appended claims.

What is claimed is:

1. A system for controlling an ignition timing for a vehicular internal combustion engine, comprising:
   (a) first means for detecting engine operating conditions;
   (b) second means for setting a basic ignition timing value according to the engine operating conditions;
   (c) third means for detecting at least one of the occurrence of engine knocking and a position at which an engine combustion pressure attains a maximum;
   (d) fourth means for calculating a feedback correction quantity for the ignition timing responsive to detection of at least one of the occurrence of engine knocking and attaining of the maximum combustion pressure;
   (e) fifth means for detecting a vehicle speed;
   (f) sixth means for setting an advance angle limit value for the feedback correction quantity according to the detected vehicle speed; and
   (g) seventh means for determining the ignition timing by addition of the feedback correction quantity to the basic ignition timing angle value.

2. A system as set forth in claim 1, which further comprises eighth means for determining whether the detected vehicle speed exceeds a predetermined speed value and wherein the sixth means retards the limit value when the eighth means determines that the vehicle speed does not exceed the predetermined speed value.

3. A system as set forth in claim 1, which further comprises eighth means for determining whether the detected vehicle speed exceeds a predetermined speed value and wherein the sixth means advances the limit value when the eighth means determines that the vehicle speed exceeds the predetermined speed value.

4. A system as set forth in claim 1, wherein the fourth means retards the feedback correction quantity by a predetermined retardation angle with respect to a previously calculated feedback correction quantity when the third means detects the occurrence of knocking and sets the feedback correction quantity to the limit value when the feedback correction quantity reaches the limit value.

5. A system as set forth in claim 4, wherein the fourth means advances the feedback correction quantity by a predetermined advance angle with respect to a previously calculated feedback correction quantity when the third means detects the occurrence of knocking and sets the feedback correction quantity to the limit value when the feedback correction quantity reaches the limit value.

6. A system as set forth in claim 1, wherein the limit value is derived from one of a plurality of different data tables selected according to the vehicle speed, with the detected engine operating conditions as parameters.

7. A system as set forth in claim 1, wherein the limit value is continuously changed responsively to changes in the vehicle speed.

8. A system as set forth in claim 7, wherein the limit value is advanced as the vehicle speed is increased.

9. A system as set forth in claim 8, wherein the third means derives a difference between the position at which the combustion pressure attains a maximum and a predetermined position and calculates the feedback correction quantity according to the derived difference.

10. A system as set forth in claim 9, wherein the third means calculates the feedback correction quantity by using an equation $FB = FB' + C \times \theta$, wherein $FB'$ denotes the feedback correction quantity derived at a previous time, $C$ denotes a correction coefficient, $\theta$ denotes the difference.

11. A system as set forth in claim 10, wherein the engine operating conditions include engine speed and fuel injection quantity.

12. A system as set forth in claim 10, wherein the third means includes a plurality of combustion pressure responsive sensors for detecting combustion pressures in respective engine cylinders.

13. A system as set forth in claim 1, which further comprises eighth means for igniting an air fuel mixture supplied to each engine cylinder according to the ignition timing value determined by the seventh means.

14. A method for controlling an ignition timing for a vehicular internal combustion engine, comprising the steps of:
   (a) detecting engine operating conditions;
   (b) setting a basic ignition timing value according to the engine operating conditions;
   (c) detecting at least one of the occurrence of engine knocking and a position at which an engine combustion pressure becomes maximum;
   (d) calculating a feedback correction quantity for the ignition timing responsive to detection of at least one of the occurrence of engine knocking and attaining of the maximum combustion pressure;
   (e) detecting a vehicle speed;
   (f) setting an advance angle limit value for the feedback correction quantity according to the detected vehicle speed; and
   (g) determining the ignition timing by addition of the feedback correction quantity to the basic ignition timing angle value.

* * * * *